United States Patent
Colussi et al.

(10) Patent No.: US 6,672,328 B2
(45) Date of Patent: Jan. 6, 2004

(54) PRESSURE-CONTROLLED THREE-WAY VALVE DEVICE FOR TRANSPORT VEHICLE TIRES

(75) Inventors: Rafael A. Colussi, Santa Fe (AR); Néstor J. Vénica, Santa Fe (AR)

(73) Assignee: Col-Ven S.A., Santa-Fe (AR)

( * ) Notice: Subject to any disclaimer, the term of this patent is extended or adjusted under 35 U.S.C. 154(b) by 24 days.

(21) Appl. No.: 10/045,851

(22) Filed: Nov. 7, 2001

(65) Prior Publication Data

US 2002/0170597 A1 Nov. 21, 2002

(30) Foreign Application Priority Data

Dec. 28, 2000 (AR) .................................... P00-01-06986
Jul. 27, 2001 (AR) .................................... P01-01-03603

(51) Int. Cl.[7] .............................................. F16K 15/20
(52) U.S. Cl. ...................... 137/102; 137/226; 152/415
(58) Field of Search ................. 137/102, 224, 137/226, 506; 152/415, 416, 417

(56) References Cited

U.S. PATENT DOCUMENTS

| | | | | |
|---|---|---|---|---|
| 2,403,436 A | * | 7/1946 | Heigis ........................ | 137/226 |
| 2,685,906 A | * | 8/1954 | Williams .................... | 152/417 |
| 2,693,841 A | * | 11/1954 | Webster, Jr. ................ | 152/417 |
| 2,780,267 A | * | 2/1957 | Richards et al. ............ | 152/417 |
| 3,070,112 A | * | 12/1962 | Fricke et al. ............... | 137/102 |
| 3,419,030 A | * | 12/1968 | Gratzmuller ................ | 137/102 |
| 4,619,303 A | * | 10/1986 | Bryan et al. ................ | 152/416 |
| 4,744,399 A | * | 5/1988 | Magnuson et al. ......... | 137/102 |
| 4,765,385 A | * | 8/1988 | McGeachy ................. | 152/416 |
| 4,922,946 A | * | 5/1990 | Boulicault .................. | 137/102 |

* cited by examiner

*Primary Examiner*—John Rivell
(74) *Attorney, Agent, or Firm*—Davidson, Davidson & Kappel, LLC

(57) ABSTRACT

A remote pressure-controlled three-way valve device has a plunger axially traversed by an inlet passage normally closed by a spring-urged inlet valve. The plunger's outer sidewall has a recess in which an O-ring extends to abut against the steps of the recess to limit the plunger stroke and keep an outlet passage closed to a venting port formed in the sidewall of the body of the device. O-ring prevents short-circuits between the inlet passage and the vent port and a spring for counteracting friction between the O-ring and the device inner wall. Filters arranged in respective ports connectable to the input air-pressure supply and the tire inner tube provide fixed seats for the springs to bear on. The plunger may dwell in a stable intermediate position that opens the outlet or deflation passage is controlled by sending an air pressure through the inlet port at 50% of the normal pressure.

24 Claims, 5 Drawing Sheets

UNPUMPED

PUMPED

CLOSED

UNPUMPED

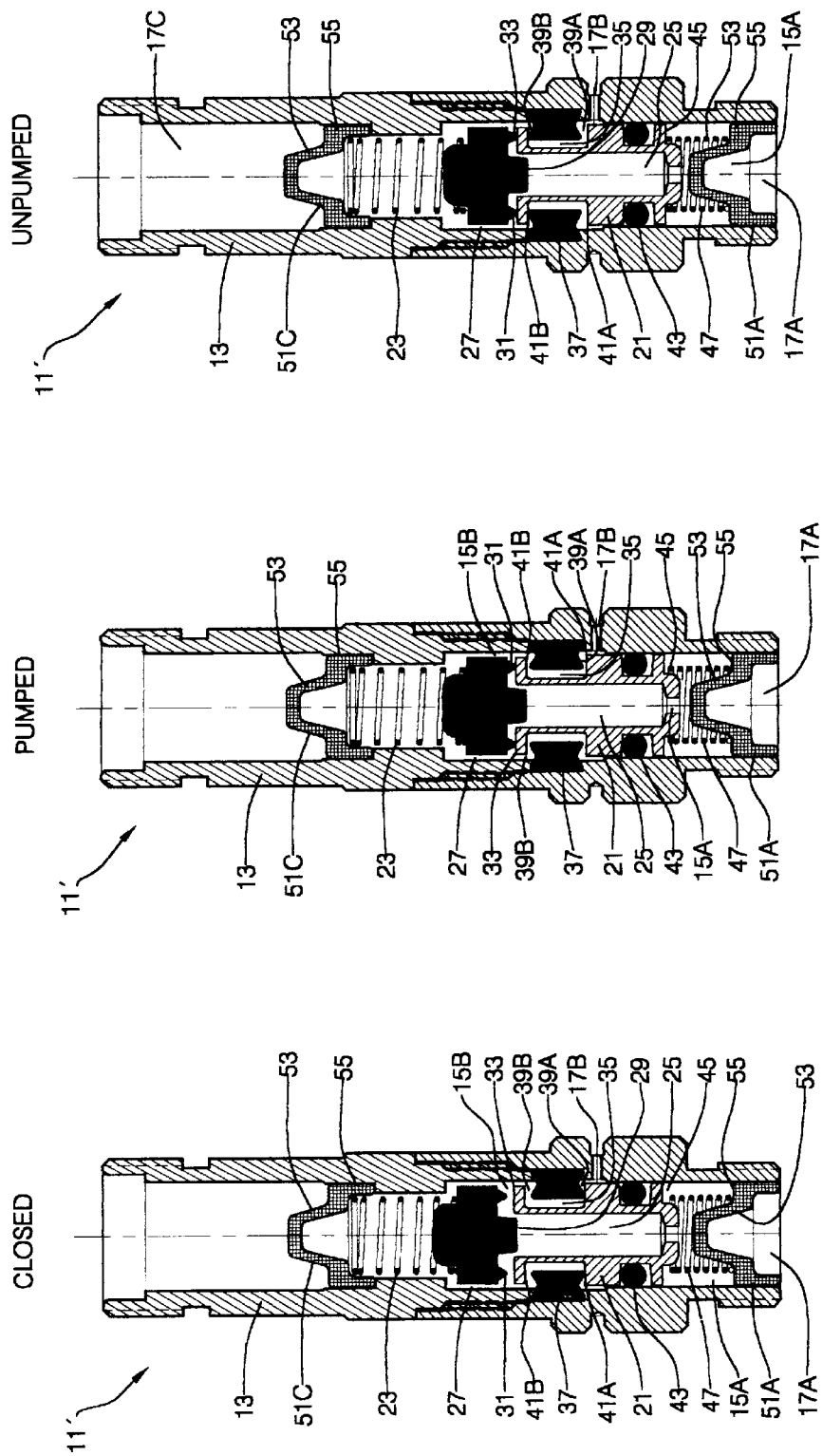

PRESSURE-CONTROLLED THREE-WAY VALVE DEVICE FOR TRANSPORT VEHICLE TIRES

FIELD AND BACKGROUND OF THE INVENTION

The present invention concerns a valve device for installation in pressurized gas or air piping and which may be controlled by means of the relative pressure of the gas applied to one port of the valve device or by the pressure differential between two ports thereof. That is, the state of the valve device may be remote-controlled via the air pressure in the pipe connected to that port, without auxiliary control lines, by varying the air pressure applied to the other end of the piping. In particular, it concerns a three-state valve device adapted to operatively adopt (i) a closed position, (ii) an open position between one pair of ports or (iii) an open position between another pair of ports, according to the pressure state in one of the ports, i.e. the valve control port.

The valve device of the present invention finds application for pumping (inflating) and unpumping (deflating) pressurized loads, in particular as a valve for a tire, such as a component for a tire-pressure control system in a motor-car vehicle. Such systems are used in transport vehicles, especially lorries and buses, since they enable corrective action to be carried out, either automatically or via driver manual control means, on the inflation state of each tire and/or wheel axle without having to stop, thereby providing an important safety feature for transport.

In the mentioned application, the valve device is inserted between one end of the piping of the installation and the air input of the tire, replacing or applying it to the conventional valve of the wheel and provides for the three fundamental operations of the system, that is: (i) to shut off the passage of air when the installation is underpressurized, to avoid the tires of the vehicle going flat, (ii) to enable sufficient air flow to pump a tire up or keep it inflated, in case of puncture for example, to avoid the vehicle having to stop anywhere, and (iii) to enable the tires to be deflated, for example for lowering the tire pressure because of road conditions.

In this application, the control port, which is coupled to one side of the plunger of the valve device, is connected to the piping. In addition to providing the state control pressure signal, at the same time it supplies the air (gas) for inflating; while a second port, coupled to the opposite side of the plunger, is connected to the tire tube and the third port may be arranged as a vent for airing pressure from the second port.

BRIEF DESCRIPTION OF THE PRIOR ART

In the stated application, in addition to being able to pump the vehicle tires up, controllably and without stopping, it is also convenient to be able to deflate the tires, under control of a remote device, such as disclosed in Argentine patent application serial number P96.01.04874, published as AR004085 A1 on Sep. 30, 1998. To this end, a conventional 3-way valve, such as a solenoide for example, would not the best choice for the component identified by reference number 39 therein, to avoid having to lay out control lines to the position of the wheels which make the installation cumbersome apart from being difficult to protect against mechanical accidents.

This problem was initially overcome by means of the two-port valve device disclosed in Argentine patent application serial number P97.01.01607, published as AR006772 A1 on Sep. 29, 1999, which conventionally comprises a valve body having a passage extending therethrough between two air input/output orifices provided on opposite longitudinal ends of the valve body, a plunger housed in the passage and spring means for urging the plunger towards a valve seat in the passage for normally closing the passage, i.e., in absence of greater pressure in the piping of the installation. The valve is provided with means for graduating the degree of opening thereof that makes it selectively bidirectional, enabling it to adopt the following positions under control of the pressure in the piping:

closed (for example, when the installation is subjected to loss of pressure), maximum degree of opening to pass air in the positive direction (inflating), when the input pressure or resultant force on the plunger is high enough to push the spring back, and minimum degree of opening for air to return in the opposite direction (deflating). In this latter position of minimum degree of opening, the valve device enables a controlled amount of air to flow back through the piping of the installation.

SUMMARY OF THE INVENTION

Hence, one object of the invention is to provide a tire valve device useful as a component within an automatic vehicle tire pressure control system. Another object is a valve device that (i) remains closed in response to a depressurization of the system, regardless of whether the system has simply been shut off or because of mechanical failure in the piping of the installation, (ii) enables passage of air through the piping of the installation to pump the tire up, in order to recover or set a normal or desired pressure, and (iii) enables air to be vented to deflate the tire, without having to pass air back through the piping of the installation.

Another object of the invention is to be able to control the state of the valve device without external controls in the structure of the valve device but by means of the resultant pressure directly applied to the plunger on the basis of the state in the piping of the installation.

Yet another object is to pneumatically control the state of the valve device by means of the air pressure present at one side of the valve.

Yet a further object of the invention is a valve device of a simple yet sturdy construction, such that it is not too expensive considering the number of like devices a multi-axle vehicle needs and that the location (on the wheel) of installation of each, respectively, difficult to protect against strikes and jerks and, therefore, exposed to mechanical accidents, for example by stones picked up the same or another vehicle.

These and another objects and advantages brought out herein are achieved by means of a pressure-controlled three-way valve device comprising a valve body through which an inlet passage extends between an inlet port and a second port and houses a plunger coupled to elastic means urging it towards the inlet port. According to the invention, the valve body includes an outlet port preceded by an outlet valve having closed positions at respective opposite stroke limits of the plunger, such that it opens only in an intermediate position range of the plunger.

According to a preferred embodiment, the outlet valve comprises a pair of circumferential steps formed on the surface of the external wall of the plunger, between which there is an O-ring formed with two internal circumferential lips in register with the steps, such that, in both stroke limit positions of the plunger, a predetermined one of the steps abuts against a corresponding lip, closing the outlet port, which may open only through respective gaps formed between the seals and the corresponding seats in the intermediate position of the plunger. The inlet passage traverses the plunger longitudinally, passing through an inlet valve normally closed by a spring.

The above objects are essentially achieved because the plunger behaves, in fact, as a mobile seat for the inlet valve, providing an intermediate range of pressures where the longitudinal displacement of the plunger is used to control the outlet valve.

A method remotely controls the state of the valve device without additional control lines, to correct or maintain a desired pressure in the tire, varying the gas pressure in the piping connected to the inlet port. The method comprises: (i) to close the valve device, depressurize the piping; (ii) to open the inlet passage for pumping, pressurize the piping in a positive differential pressure range (i.e., greater than the air pressure in the tire); and (iii) to open the vent port and deflate the tire, apply air/gas to the inlet port at a pressure within a second range substantially lower than the pressure at the second port, that is a "negative" differential relative to the second port (for example, initially depressurizing and then increasing the pressure at the inlet port to the desired pressure). In the first case, the valve device functions to protect the pressure present on the controlled side, whereas, in the other two cases, it functions to recover or correct the tire pressure under control, equalizing it to the pressure present in the piping.

In a more preferred embodiment, to improve reliability and operation speed of the valve device, the average initial friction of the O-ring is compensated by adding a second spring or equivalent elastic means to provide a threshold force urging of the plunger towards the inlet valve having a piston or closing means moveably seated on the plunger. This spring is in opposition to the first spring urging the inlet valve against the plunger and is dimensioned to yield to the force of the latter absent enough air pressure at the inlet port and, at the same time, urge the plunger to recover faster in response to a control pressure signal at the inlet port.

In an even more preferred embodiment, respective filters are arranged in both ports to protect the valve components from dust and dirt entering eventually via the ports and coming from the inflater system and the tire. These filters may be placed in these ports for seating the springs respectively urging the piston and the plunger.

The present invention may find application in medium and heavy road vehicles wherein the pump-up pressure of the tires is controlled via pressurized air piping connected to each controlled tire as a load of the piping by means of a respective valve device according to the invention.

BRIEF DESCRIPTION OF THE DRAWINGS

These and other features and details of the subject matter of this invention and how it may be developed, implemented and put into practice may be better understood from the following detailed description of preferred embodiments illustrated in the attached drawings, wherein:

FIGS. 1, 2 and 3 are longitudinal cross-sectional views of the valve device according to a first embodiment of the present invention wherein: FIG. 1 shows the valve device in the closed position (i), FIG. 2 shows the valve device in the inflation position (ii), and FIG. 3 shows the valve device in the deflated position (iii).

FIGS. 5, 6 and 7 are longitudinal cross-sectional views of the valve device according to a preferred embodiment of the present invention wherein: FIG. 5 shows the valve device in the closed position (i), FIG. 6 shows the valve device in the inflation position (ii), and FIG. 7 shows the valve device in the deflated position (iii).

PREFERRED EMBODIMENTS OF THE INVENTION

Figure 1:
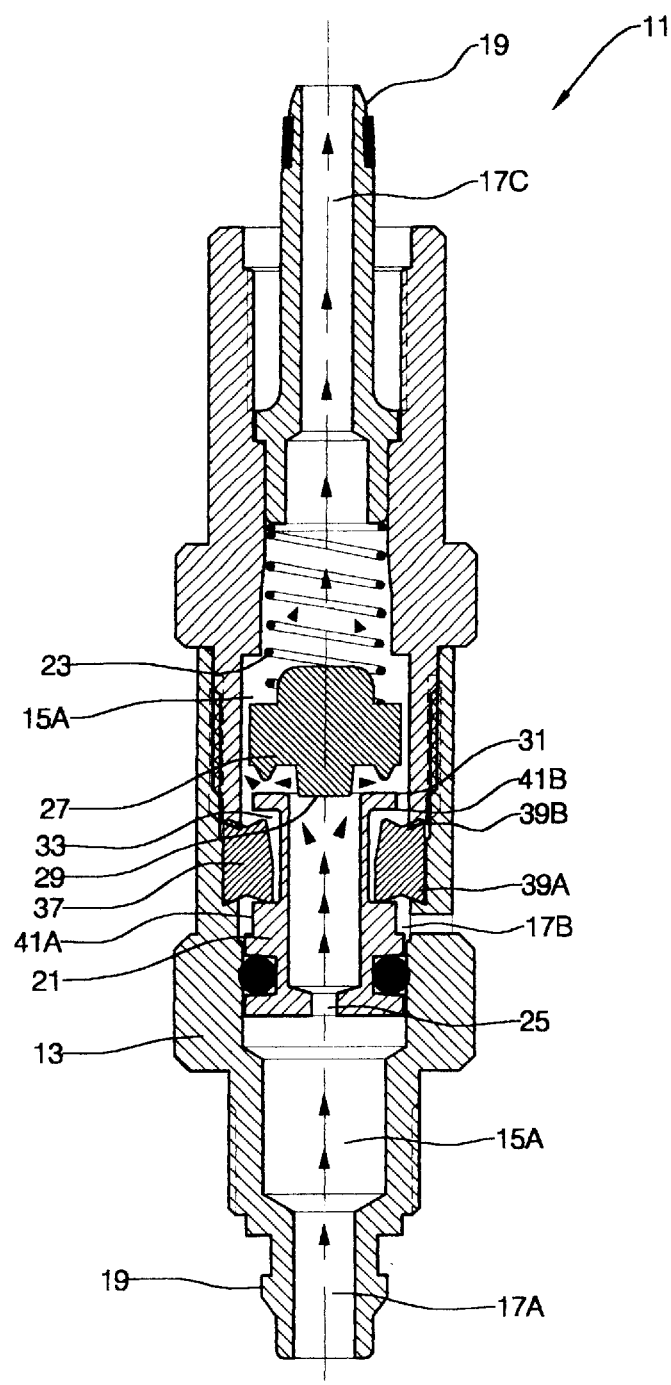

The embodiments of the valve device according to the invention disclosed in detail hereinafter relate to a valve device for controlling pressure states in a vehicle tire and may be used, for example, as the component designated by reference numeral 39 in the abovementioned Argentine patent application N° P96.01.04874.

Figure 2:
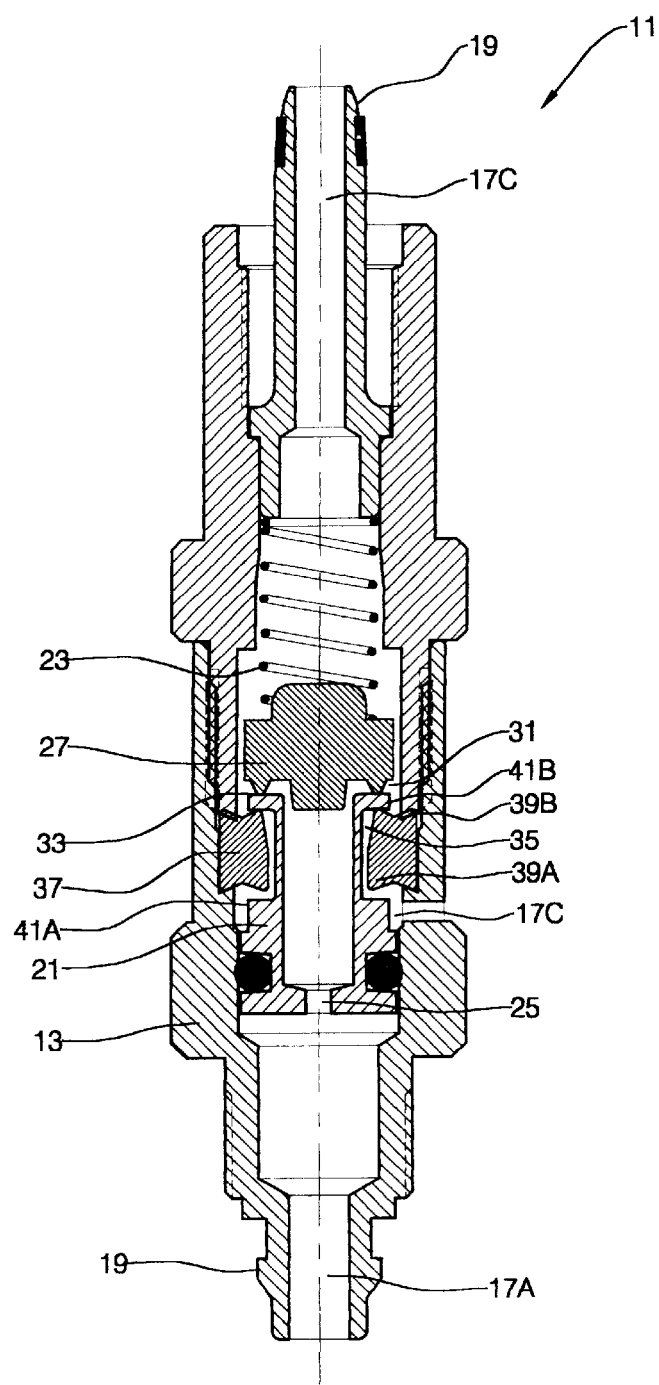
Figure 3:
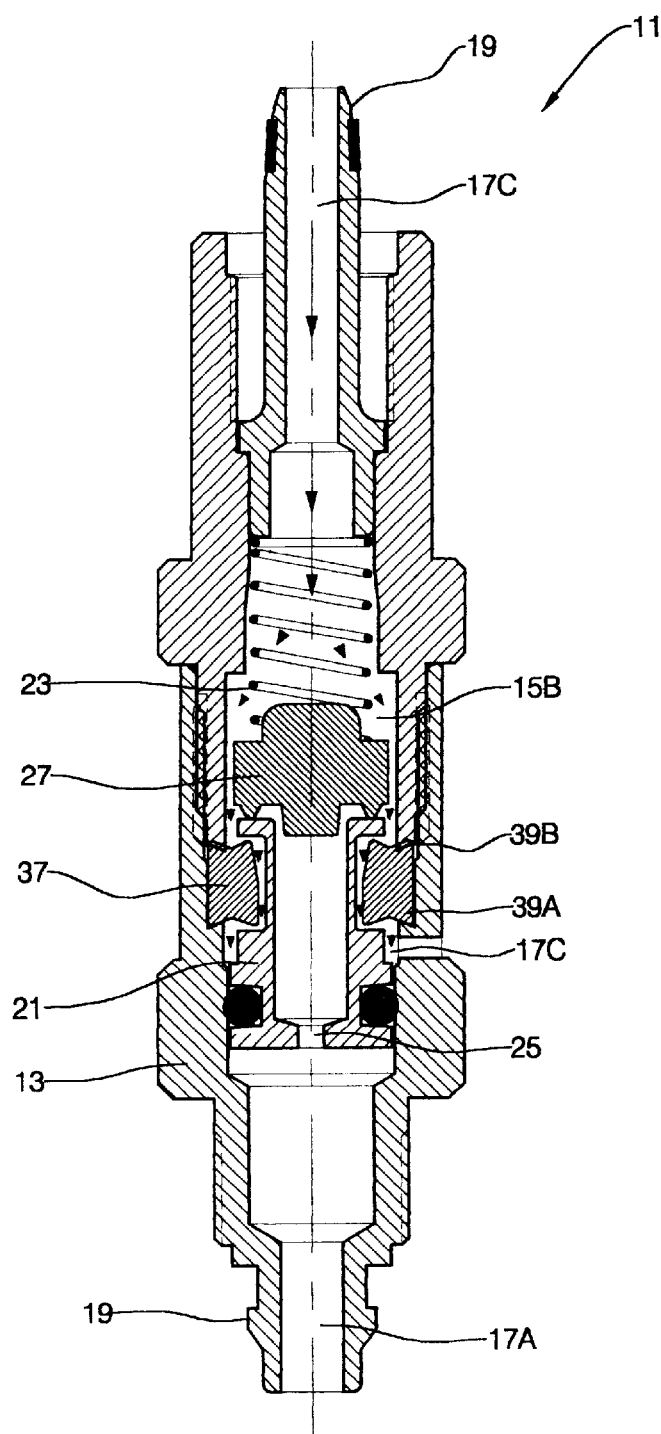

Construction:

FIGS. 1, 2 and 3 show a sectional view of a two-valve device 11 according to the present invention. The two-valve device 11 comprises a valve body 13 housing an inlet circuit 15A extending longitudinally between two air ports 17A, 17C provided at respective longitudinally-opposite ends 19 of the valve body 13. The port 17A is for the inflow of inflating air. Accordingly, it is coupled to the pressurizing installation piping (not shown), from which it receives both the inflating airflow and pressure signals for controlling the valve device 11. The port 17C is coupled to the tire tube (not shown), such that it behaves as an inflating air inlet/deflating air outlet conduit. A port 17B is provided on one side of the valve body 13 to define a deflating air outlet port in communication with port 17C through an outlet circuit 15B.

The inside of the valve body houses a plunger 21 having a longitudinal stroke and urged by a spring towards the inlet port 17A end. The plunger 21 is internally traversed by an axial passage 25 normally closed by an inlet valve comprising a piston 27 axially slidable within the valve body 13 and urged by spring 23 against a plunger end. The piston has an axial projection 29 that protrudes into the inner passage 25 of the plunger in order to keep the piston axially centered relative to the plunger and a circumferential lip closing against end 33 of plunger 21, thus normally closing the outlet of the passage 25. The piston 27 does not seal against the side wall of the valve body 13 but rather features longitudinal slots allowing for gas flow.

A circumferential recess 35 is provided on the outer surface of the plunger 21 in which an O-ring 37, arranged against the surface of the valve body 13 inner wall, extends laterally and inwards. This O-ring 37 also has a pair of circumferential lips 39A, 39B in respective correspondence with the pair of steps 41A, 41B defined by the recess 35. Thus, the stroke of the plunger 21 is limited by the steps 41 (for generalization, suffixes "A", "B", etc. are omitted from the reference numerals) alternatively abutting against lips 39.

Operation:

To inflate the tire, pressurized air is applied to the inlet port 17A, at a pressure sufficiently exceeding the tire pressure at port 17C to push plunger 21 against the spring 23, until step 41A abuts against lip 39A of seal 37, thus keeping the air passage to the venting port 17B closed. Plunger 21 stops at this stroke limit, but the air pressure in inlet port 17A acts on piston 27 until the spring 23 yields to open passage 25, thus enabling the tires to be inflated.

Thus, a drop in tire pressure, for example as a result of a flat tire, causes a positive pressure differential generating a net resultant on plunger 21 in the direction of port 17C, sufficient for the spring 23 to yield and fully open the inlet circuit 15A, as shown in FIG. 1.

The device of the invention is designed in anticipation of a possible breakdown or fault in the installation, in which case the valve device 11 automatically closes during any depressurization of the piping. Therefore, in the absence of air pressure in the inlet port 17A, the spring 23 urges the valve piston 27 against the plunger 21, thus closing the passage 25, as well as the plunger 21 to its limit position in the direction of the inlet port 17A, whereby the other step 41B abuts against the other lip 39B of seal 37, thus closing the air flow through the deflation circuit 15B, that is isolating the venting port 17B from port 17C coupled to the tire, the three ports of the valve thus remaining blocked, as shown in FIG. 2.

To reduce the pressure in the tire, the driver should first depressurize the piping, depriving the inlet port 17A of air pressure (ensuring the momentary blocking of all the vehicle tires) and then increase the pressure to the desired tire calibration pressure. The plunger 21 is then urged to an intermediate position wherein respective gaps are opened between both assemblies of lips 39 and steps 41, as shown in FIG. 3, so that air vents through the passage 15B towards the outlet port 17B. The dynamic state of the plunger 21 may be summarized by equation [1]:

$$P_A \cdot S_A = P_C \cdot S_C + K_{23} \cdot X_{23} \quad [1]$$

wherein:

$P_A$: air pressure at the inlet side;
$S_A$: cross-section area of plunger 21 at the inlet side;
$P_C$: air pressure at the tire side;
$S_C$: cross-sectional area of plunger 21 at the tire side;
$K_{23}$: elastic constant of the spring 23; and
$X_{23}$: amount of compression of spring 23.

By way of simplification, taking into account that the ratio $S_C/S_A = \sigma$ is a constant ratio (depending upon the component geometric parameters such as the diameter of valve lip 31) and defining variable $R = K_{23} \cdot X_{23}/S_A$ (also constant), the state of balance of plunger 21 in its intermediate position may be characterized by the following equation [2]:

$$P_A = \sigma P_C + R \quad [2]$$

This equation [2] defines the operation states of the valve device 11. According to this equation [2], to place the plunger in the intermediate position, the pressure signal $P_A$ in the inlet port 17A should equal the sum defined in the right-hand member of equation [2], determined by the tire pressure $P_C$ and the recovery force R of spring 23 semi-compressed a length X. In addition, for the inflation operation, the inlet pressure $P_A$ must meet condition of equation [3]:

$$P_A \geq \sigma P_C + R_A \quad [3]$$

Wherein $R_A$ is the recovery force of spring 23 for a compression $X_A$ thereof corresponding to the limit 39A–41A.

In short, provided that:
(i) $PA < \sigma P_C + R_B$, wherein $R_B = R(X_B)$ for the plunger abutting against lip 39B of seal 37, the seal of lip 39B is closed against step 41B, thus bringing the two-valve device 11 to the closed condition.
(ii) $P_A > \sigma P_C + R_A$, the seal of lip 39A abuts against step 41A, thus allowing the two-valve device 11 to be in a position capable of inflating, the inflation condition being reached by adding an overpressure $\Delta P_A$ to force piston 27 against spring 23 and open the inflating port 15A.
(iii) $P_A = \sigma P_C + R(X)$, for $X_B < X < X_A$, the plunger 21 "floats" in an intermediate position without any contact with seal 37, the deflating port 15B thus being opened.

In the exemplary embodiment described, $\sigma = 0.48$ and in a first approximation $R(X_A) \cong R(X_B) \approx 0$ may be neglected depending on the selection of the spring 23. Assuming a calibrated pressure of 7 kg/cm² (16.5 kPa), it appears that the opening of outlet valve 39–41 takes place in the vicinity of:

$$P_A = \sigma P_C = 0.48 \times 7 \text{ kg/cm}^2 = 3.36 \text{ kg/cm}^2$$

Figure 4A:
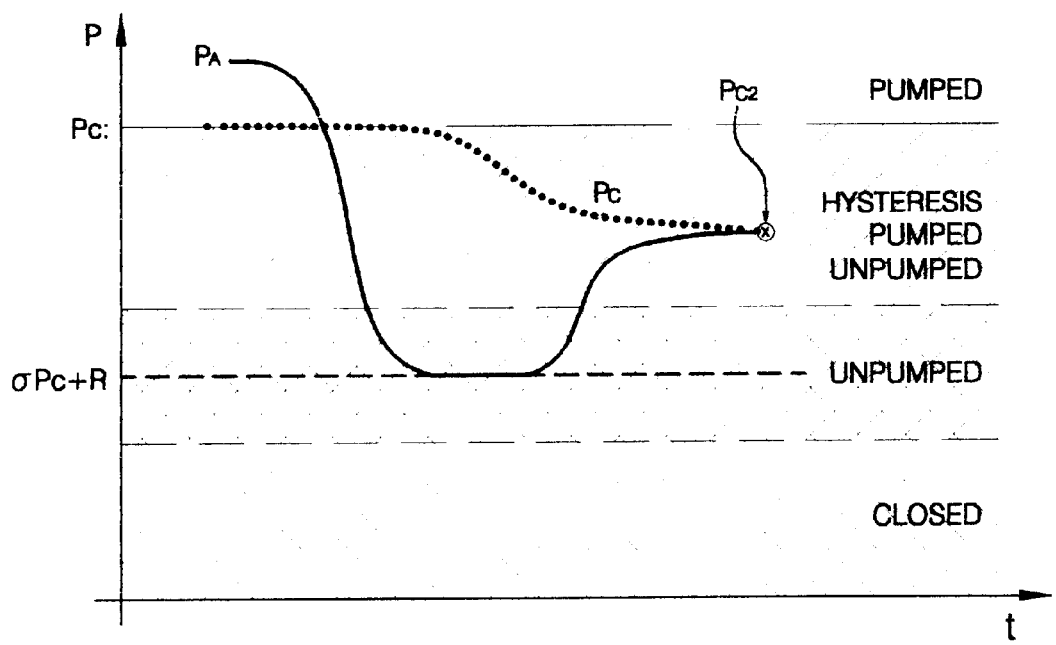
FIGS. 4A and 4B are two state of pressure versus time graphs depicting the operation of the valve.
Figure 4B:
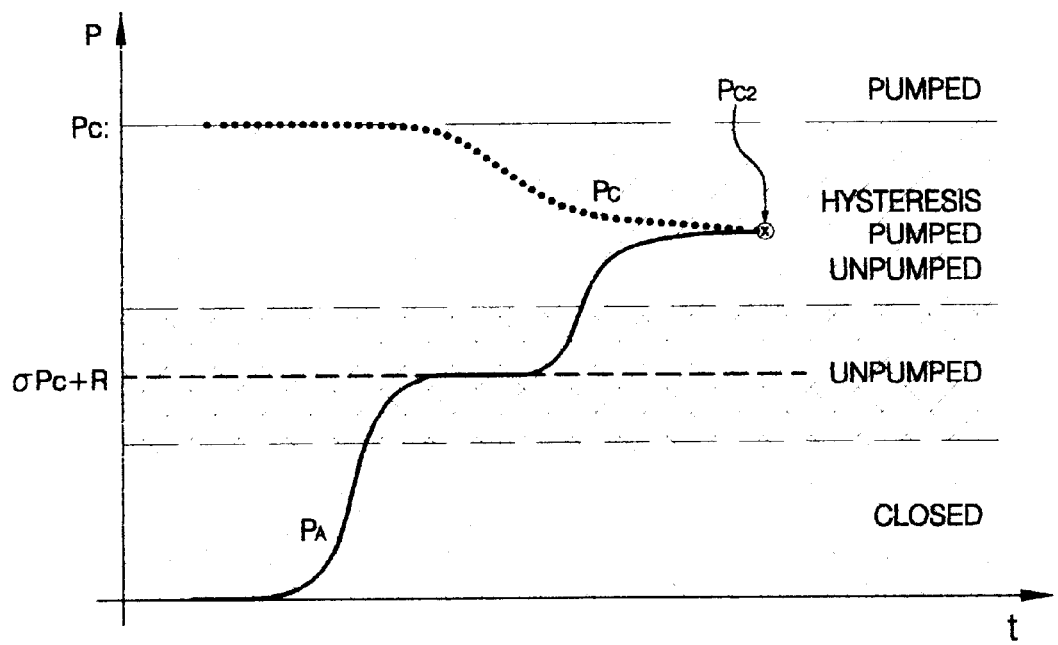

This is illustrated in FIGS. 4A and 4B. Both figures depict the different conditions of the two-valve device 11, separated by constant pressure straight lines, such conditions being the three states as mentioned above and a fourth state for which, in practice, hysteresis is observed between the inflation and deflation states. Therefore, to deflate the loading tire at a slightly lower pressure $P_{C2}$ in the hysteresis region, the inlet pressure $P_A$ may be initially reduced, for example 45% of the calibration value $P_{C1}$, ensuring that the device enters the deflation region during a short time interval, and then increase the inlet pressure $P_A$ to the desired level $P_{C2}$, as shown in FIG. 4A. FIG. 4A shows how the tire pressure is brought to the desired level $P_{C2}$ from a depressurized inlet piping.

The operation principles described result from the plunger 21 functioning as a mobile seat for inlet valve 27, thus generating an intermediate pressure range within which the longitudinal movement of plunger 21 is used as a mobile element for the outlet valve.

Various modifications or changes to the invention as shown in the specific embodiment described may become evident to the skilled in the art, without departing from the scope and purview of the invention. For example, another gas or fluid may be used other than air or mixed with air. The valve device 11 of the invention may also be used in applications such as selectively pumping or purging a gas to and from a load. For example, as a previous step to deflating the load, rather than depressurizing the inlet port 17A, its pressure $P_A$ may be reduced to a value low enough such as 45% of pressure $P_C$ in the second port 17C.

In a preferred example, illustrated in FIGS. 5 to 7, a two-valve device 11' basically similar to that of FIGS. 1 to 3 with the following addenda.

An O-ring 43 is arranged between the base of the plunger 21 and the vent orifice 17B for sealing an eventual leak circuit between this orifice 17B and the inlet orifice 17A through a gap between the relatively moveable walls of the plunger 21 and the body of the valve 13. The O-ring 43 is preferable housed in a circumferential recess formed in the outer wall of the plunger 21. Another circumferential recess is formed in the base of the plunger 21 for affixing one end of an opening spring 47. The other end of the spring 47 bears against a step 55 formed in a filter 51A described hereinafter in the next paragraph. In this way, when the plunger 21 is in the closed position illustrated in FIG. 5, an increase in pressure at the inlet port 15A sufficient to compress the piston 27 against its spring 23 will be followed by the plunger 21 moving in the same direction, pushed by the spring 47.

Both ports 17A and 17C may each house filters 51A, 51C to prevent operation of the valve mechanisms from being affected by dirt or dust carried in by the air. Each filter 51 comprises a filter element allowing for passage of the air therethrough and having an apex pointing towards the outlet 17C and a circumferential recess 55 formed on the filter 51 piece itself, for the corresponding spring 23, 47 to bear on.

The pumping and unpumping (deflating) operations are as described hereinbefore in reference to the embodiment of FIGS. 1 to 3. For the pumping operation, the spring 47 helps the force of the air overpressure at the inlet port 17A to push the plunger 21 against the spring 23. More importantly, the spring 47 assists in the venting operation by overcoming the friction reaction of the O-ring 43 against the valve wall opposing the movement of the plunger 21 to its intermediate position, shown in FIG. 7.

The dynamic state of the plunger 21 may be summarized by equation [1']:

$$P_A \cdot S_A + K_{47} \cdot X_{47} = P_C \cdot S_C + K_{23} \cdot X_{23} \qquad [1']$$

wherein:

$K_A$: elastic constant of the spring 47 and $X_A$: amount of compression of the spring 47;

Like in the preceding embodiment, it may be shown that the position of the plunger 21 depends on the ratio $P_A:P_C$. The system of the spring 47 reduces the "inertia" of the plunger 21 due to the "friction" of the o-ring 43 along the inner wall of the body 13. Since the spring 47 is arranged to help open the pumping-up valve, it is dimensioned to balance the sum of the force of the spring 23 in the closed position and the opposition of the O-ring 43 to moving. For example, if the spring of the piston opposes a force of 70 grams when it is stretched out in the closed position and the friction of the O-ring 43 against the inner cylindrical wall of the body 13 is 30 grams, then the spring 47 is dimensioned to exert a 100-gram force in the compressed position of FIG. 5.

We claim:

1. A pressure-controlled three-way valve device comprising:
   a valve body having an inlet port, a second port, an outlet port, an inlet passage extending through said a valve body between said inlet port and said second port, and an outlet passage extending between said outlet port and said second port;
   a plunger housed in said inlet passage and moveable within said inlet passage between a pair of opposite seats, said pair of seats comprising a pair of circumferential steps formed on the plunger outer wall surface;
   an o-ring located between said steps;
   recovery means for urging said plunger in the direction of the inlet port; and
   an outlet valve in said outlet passage, said outlet valve comprising a pair of seals located in said outlet passage, and which alternatively abut against said pair of seats such that said outlet passage is opened by means of respective gaps formed between said seals and the seats corresponding thereto when the position of said plunger is in said intermediate range, whereby said outlet valve remains closed when the plunger is in abutment against one of said seats, such that said outlet passage is opened by means of said outlet valve when the position of said plunger is in a range intermediate said seats,
   said pair of seals comprising two inner circumferential lips formed on said o-ring in respective correspondence with said circumferential steps, whereby in a limit position of said plunger stroke a predetermined one of said steps abuts against the corresponding lip, thus closing said outlet passage which is otherwise open when said o-ring is in a position intermediate said steps.

2. The valve device according to claim 1, wherein said outlet port comprises a venting port laterally implemented in said valve body.

3. The valve device according to claim 1, wherein said plunger forms a mobile seat for an inlet valve normally closed between said inlet port and said second port.

4. The valve device according to claim 3, wherein said inlet passage longitudinally traverses said plunger, extending from a plunger end in communication with said inlet port to the opposite end where said inlet valve is located and is normally closed by elastic recovery means.

5. The valve device according to claim 4, wherein said plunger and said inlet valve are urged by the same recovery means in the direction of the inlet port.

6. The valve device according to claim 4, wherein said recovery means comprises a spring resting on said valve body proximate to said second port.

7. The valve device according to claim 6, wherein said inlet valve comprises a piston body seated against said spring and axially opposing said plunger, said piston body having an axial projection fitting in said passage longitudinally traversing the plunger and a circumferential lip formed in the opposite end of said plunger.

8. The valve device according to claim 1, wherein a ring is arranged around said plunger to form a sliding seal against said valve body.

9. A pressure-controlled three-way valve device comprising:
   a valve body having an inlet port, a second port, an outlet port, an inlet passage extending through said a valve body between said inlet port, and said second port, and an outlet passage extending between said outlet port and said second port;
   a plunger housed in said passage and moveable within said inlet passage between a pair of stroke limit positions;
   first recovery means for urging said plunger in the direction of the inlet port; second recovery means coupled to said plunger for urging said plunger towards said outlet valve in opposition to said first recovery means; and
   an outlet valve in said outlet passage, said outlet valve remaining closed when the plunger is in one of said stroke limit positions, such that said oulet passage is opened by means of said outlet valve when the position of said plunger is in a range intermediate said stroke limit positions.

10. The valve device according to claim 9, wherein
    said stroke limits of said plunger comprise a pair of opposite seats and
    said outlet valve comprises a pair of seals located in said outlet passage and which alternatively abut against said pair of seats such that said outlet passage is opened by means of respective gaps formed between said seals and the seats corresponding thereto when the position of said plunger is in said intermediate range.

11. The valve device according to claim 9, wherein said inlet port is formed with a seat and said second recovery means comprises a spring arranged between said plunger and said inlet port seat.

12. The valve device according to claim 11, wherein said spring is dimensioned to sufficiently compress in response to the pressure in said second port substantially exceding the pressure in said inlet port.

13. The valve device according to claim 11, wherein
    said inlet port houses a filter and
    said seat is formed on said filter.

14. The valve device according to claim 13, wherein
    said second port houses a second filter and
    said first recovery means comprises another spring arranged between said plunger and said seat on said second filter.

15. The valve device according to claim 14, wherein each filter comprises a cone-shaped element the apex of which points outwardly of said valve body and a ring-shaped base integrated to said cone-shaped element of the filter and defining a seat for the fixed end of the corresponding spring.

16. The valve device according to claim 9, wherein a ring is arranged around said plunger to form a sliding seal against said valve body.

17. The valve device according to claim 16, wherein said second recovery means is dimensioned to counterbalance initial friction of said ring sliding against said valve body during opening of said inlet passage.

18. The valve device according to claim 9, wherein said outlet port comprises a venting port laterally implemented in said valve body.

19. The valve device according to claim 9, wherein said plunger forms a mobile seat for an inlet valve normally closed between said inlet port and said second port.

20. The valve device according to claim 19, wherein said inlet passage long-itudinally traverses said plunger, extending from a plunger end in communication with said inlet port to the opposite end where said normally closed inlet valve is located.

21. The valve device according to claim 20, wherein said plunger and said inlet valve are urged by the same first recovery means in the direction of the inlet port.

22. The valve device according to claim 20, wherein said first recovery means comprises a spring resting on said valve body proximate to said second port.

23. The valve device according to claim 22, wherein said inlet valve comprises a piston body seated against said spring and axially opposing said plunger, said piston body having an axial projection fitting in said passage longitudinally traversing the plunger and a circumferential lip formed in the opposite end of said plunger.

24. A vehicle including a plurality of tires and pressure-controlled means for remote-controlling the individual pressure of at least one of said tires, said pressure-controlled means including pipe means for feeding pressurized air to each such tire, wherein each such tire is coupled to said pressurized air feeding pipe by means of a respective valve device, said valve device comprising:

a valve body having an inlet port, a second port, a venting port laterally formed in said valve body, an inlet passage extending through said a valve body between said inlet port and said second port, and an outlet passage extending between said outlet port and said second port;

an inlet valve housed in said valve body normally closed between said inlet port and said second port;

a plunger housed in said passage and moveable within said inlet passage between a pair of stroke limit positions, said plunger forming a mobile seat for said inlet valve; said stroke limits of said plunger comprise a pair of opposite seats, each comprising a respective circumferential step formed on the plunger outer wall surface;

recovery means for urging said plunger in the direction of the inlet port; and an outlet valve in said outlet passage, said outlet valve comprising an o-ring located between said steps and a pair of seals located in said outlet passage, said seats each comprising an inner circumferential lip formed on said o-ring in respective correspondence with said circumferential steps, whereby in a limit position of said plunger stroke a predetermined one of said steps abuts against the corresponding lip, thus closing said outlet passage which is otherwise open when said o-ring is in a position intermediate said steps.

* * * * *